(12) United States Patent
Axilrod

(10) Patent No.: US 8,468,087 B2
(45) Date of Patent: Jun. 18, 2013

(54) METHODS AND SYSTEMS FOR NETTING OF PAYMENTS AND COLLATERAL

(75) Inventor: Peter Axilrod, New York, NY (US)

(73) Assignee: Depository Trust & Clearing Corporation, New York, NY (US)

(*) Notice: Subject to any disclaimer, the term of this patent is extended or adjusted under 35 U.S.C. 154(b) by 122 days.

(21) Appl. No.: 12/686,119

(22) Filed: Jan. 12, 2010

(65) Prior Publication Data
US 2010/0205088 A1    Aug. 12, 2010

Related U.S. Application Data

(63) Continuation of application No. 11/260,991, filed on Oct. 28, 2005, now Pat. No. 7,650,309.

(60) Provisional application No. 60/623,298, filed on Oct. 28, 2004.

(51) Int. Cl.
*G06Q 40/00* (2012.01)
*G06Q 40/02* (2006.01)

(52) U.S. Cl.
CPC .................................... *G06Q 40/02* (2013.01)
USPC .............. 705/38; 705/44; 705/54; 705/37; 705/39; 705/35; 707/790

(58) Field of Classification Search
USPC ............... 705/30–45, 26.35; 707/790
See application file for complete search history.

(56) References Cited

U.S. PATENT DOCUMENTS

| | | | |
|---|---|---|---|
| 4,903,201 A | 2/1990 | Wagner | |
| 5,077,665 A | 12/1991 | Silverman et al. | |
| 5,195,031 A | 3/1993 | Ordish | |
| 5,727,165 A | 3/1998 | Ordish et al. | |
| 5,787,402 A | 7/1998 | Potter et al. | |
| 5,802,499 A | 9/1998 | Sampson et al. | 705/35 |
| 5,819,230 A * | 10/1998 | Christie et al. | 705/4 |
| 5,950,177 A | 9/1999 | Lupien et al. | |
| 5,973,619 A | 10/1999 | Paredes | |
| 6,029,146 A | 2/2000 | Hawkins et al. | |
| 6,035,287 A | 3/2000 | Stallaert et al. | |
| 6,076,074 A * | 6/2000 | Cotton et al. | 705/40 |
| 6,131,087 A | 10/2000 | Luke et al. | |
| 6,161,099 A | 12/2000 | Harrington et al. | |
| 6,236,972 B1 | 5/2001 | Shkedy | |
| 6,247,000 B1 | 6/2001 | Hawkins et al. | |
| 6,317,727 B1 | 11/2001 | May | |

(Continued)

FOREIGN PATENT DOCUMENTS

| | | |
|---|---|---|
| EP | 512702 | 11/1992 |
| EP | 1770617 | 4/2007 |

(Continued)

OTHER PUBLICATIONS

Medina et al., "Tailoring internal models," www.risk.net, 4 pages (Mar. 2003).

(Continued)

*Primary Examiner* — Tien Nguyen
(74) *Attorney, Agent, or Firm* — Proskauer Rose LLP

(57) ABSTRACT

The present invention generally provides for systems and methods for netting payments and collateral. Generally, systems and methods of the present invention maximize market liquidity and minimize financial risk and collateral burdens of participants.

16 Claims, 8 Drawing Sheets

U.S. PATENT DOCUMENTS

| | | |
|---|---|---|
| 6,347,307 B1 | 2/2002 | Sandhu et al. ............... 705/35 |
| 6,560,580 B1 | 5/2003 | Fraser et al. ............... 705/37 |
| 6,731,729 B2 | 5/2004 | Eng et al. ............... 379/121.03 |
| 6,850,907 B2 | 2/2005 | Lutnick et al. |
| 7,020,632 B1 | 3/2006 | Kohls et al. |
| 7,080,050 B1 | 7/2006 | Himmelstein |
| 7,124,106 B1 | 10/2006 | Stallaert et al. |
| 7,143,060 B2 | 11/2006 | Foster et al. |
| 7,171,386 B1 | 1/2007 | Raykhman |
| 7,212,999 B2 | 5/2007 | Friesen et |
| 7,231,363 B1 | 6/2007 | Hughes et al. |
| 7,246,093 B1 | 7/2007 | Katz |
| 7,287,089 B1 | 10/2007 | Lamoureux et al. |
| 7,333,952 B1 | 2/2008 | Neyman et al. |
| 7,337,140 B2 | 2/2008 | Brady et al. |
| 7,356,498 B2 | 4/2008 | Kaminsky et al. |
| 7,366,690 B1 | 4/2008 | Howorka et al. |
| 7,447,654 B2 | 11/2008 | Ben-Levy et al. |
| 7,596,526 B2 | 9/2009 | Blauvelt et al. |
| 7,599,877 B1 | 10/2009 | Cole et al. |
| 7,636,682 B1 | 12/2009 | MacPherson |
| 7,702,563 B2 | 4/2010 | Balson et al. |
| 7,720,742 B1 | 5/2010 | Mauro et al. |
| 7,827,085 B1 | 11/2010 | Hochenberger et al. |
| 7,882,017 B2 | 2/2011 | Howorka et al. |
| 7,890,416 B2 | 2/2011 | Kirwin et al. |
| 7,912,779 B2 | 3/2011 | Saliba |
| 8,005,743 B2 | 8/2011 | Tupper et al. |
| 2001/0042041 A1 | 11/2001 | Moshal et al. |
| 2002/0120555 A1 | 8/2002 | Lerner |
| 2002/0156719 A1 | 10/2002 | Finebaum et al. |
| 2002/0194115 A1 | 12/2002 | Nordlicht et al. |
| 2003/0083973 A1 | 5/2003 | Horsfall |
| 2005/0015329 A1 | 1/2005 | Tyson-Quah ............... 705/38 |
| 2005/0086165 A1 | 4/2005 | Pawelczyk et al. ............... 705/40 |
| 2005/0108145 A1 | 5/2005 | Kastel et al. ............... 705/37 |
| 2005/0114255 A1 | 5/2005 | Shields et al. ............... 705/37 |
| 2005/0137956 A1 | 6/2005 | Flory et al. ............... 705/37 |
| 2006/0282356 A1 | 12/2006 | Andres et al. ............... 705/35 |
| 2007/0061231 A1 | 3/2007 | Kim-E |
| 2007/0061260 A1 | 3/2007 | deGroeve et al. ............... 705/44 |

FOREIGN PATENT DOCUMENTS

| | | |
|---|---|---|
| WO | 9856024 | 12/1998 |
| WO | 9905629 | 2/1999 |
| WO | 9926175 | 5/1999 |
| WO | 9927477 | 6/1999 |
| WO | 0011587 | 3/2000 |
| WO | WO 01/39060 | 5/2001 |
| WO | 0159661 | 8/2001 |
| WO | 0171459 | 9/2001 |
| WO | 0171611 | 9/2001 |
| WO | 0201473 | 1/2002 |
| WO | 03034184 | 4/2003 |

OTHER PUBLICATIONS

Schroeder et al., "eSpeed Expands Patent Litigation Strategy", Securities Industry News, Factiva Query, 2 pages (Jul. 14, 2003).

Skorecki, A., "Algorithm makes €420bn multi-swaps possible," FT.com, 1 page, May 1, 2003.

"Cantor sues ICAP in Patent Dispute", eFinancial News, 1 page (Jul. 2, 2003).

Davies et al., "ESpeed and Broker Tee in new legal war—Electronic Trading.", Financial Times, 2 pages, (Jul. 2, 2003).

"Spencer vs. Cantor, the rematch—Observer Column.", Financial Times, 1 page, (Jul. 2, 2003).

Moore et al., "City—Cantor sues Icap in patent dispute", The Daily Telegraph, 1 page, (Jul. 2, 2003).

Observer—US., Financial Times (Ft. Com), 2 pages, (Jul. 1, 2003).

Lucchetti et al., ESpeed Sues Rival Broker Tee, Alleging Violation of a Patent, The Wall Street Journal, 1 page (Jul. 1, 2003).

Leighton-Jones et al., "Industry reassesses its overall technology goals", The Financial News, 3 pages, (Jan. 5, 2003).

Court, et al., "Saga of conflict with one moving lull", The Times, 1 page, (Oct. 10, 2002).

Balto, David A., "Payment Systems and Antitrust: Can the Opportunities for Network Competition be Recognized?", Federal Reserve Bank of St. Louis Review, 77(6): 19(22) (Nov.-Dec. 1995).

Reck, M. "Trading Process Characteristics of Electronic Auctions," Focus Theme, vol. 7(4) (1997), pp. 17-23. (http://www.electronicmarkets.org/articles/issues/volume-7/volume-7-issue-4/v7n3_reck0.pdf).

Trairatvorakul, P. "Improvement of Clearing and Settlement for Sound Development of Bond Market," The Third Asia Development Forum: Asia's Future Economy, Bangkok, Thailand ADBI Workshop (Jun. 2001), 22 pgs. (61.91.255.2/infocenter/en/speech/ADBI3.pdf).

Scarlata, J. "Institutional Developments in the Globalization of Securities and Futures Markets," White paper from stlouisfed.org, Federal Reserve Bank of St. Louis, Economic Times (1992), pp. 17-30. (http://www.research.stlouisfed.org/publications/review/92/01/Developments_Jan_Feb1992.pdf).

Pardy, R. "Regulatory and Institutional Impacts of Securities Market Computerization," White paper from worldbank.org (1992), 76 pgs. (http://www-wds.worldbank.org/servlet/WDSContentServer/WDSP/I B/1992/02/01/00000265_3961002142245/Rendered/PDF/multi_page.pdf).

Smits M. et al. "Improving Performance of Financial Securities Transactions Processes," Focus Theme EM—Electronic Markets (1998), pp. 26-30. (http://www.electronicmarkets.org/articles/issues/volume-8/volume-8-issue-4/improvingperformance0.pdf).

Tay, Y. "Managing Risk with Composite Information Systems," Research Assistantship Report (May 1990), 32 pgs. (http://web.mit.edu/smadnick/www/wp2-old%20names/CIS%2390-10.pdf).

Guadamillas, M. et al. Securities Clearance and Settlement Systems: A Guide to Best Practices or, "How to assess securities clearance and settlement systems, based on international standards and best practices," Policy Research Working Paper 2581 (Apr. 2001), 44 pgs. (http://www-wds.worldbank.org/servlet/WDSContentServer/WDSP/IB/2001/05/08/000094946_01042407280024/Rendered/PDF/multi0page.pdf).

Giddy, I. et al. "Barriers to European Financial Market Integration: Clearance and Settlement of Equities," Salmon Center, New York University (1995), 56 pgs. (http://flora.insead.edu/fichiersti_wg/Inseadwp1995/95-87.pdf).

Desharnais, P. "Agent Assisted Price Negotiation for Electronic Commerce," A Thesis in the Department of Computer Science Presented in Partial Fulfillment of the Requirements for the Degree of Master of Computer Science at Concordia University, Montreal, Quebec, Canada (Apr. 2000), 104 pgs. (http://www.collectionscanada.gc.ca/obj/s4/f2/dsk1/tape3/PQDD_0020/MQ54330.pdf).

* cited by examiner

METHODS AND SYSTEMS FOR NETTING OF PAYMENTS AND COLLATERAL

CROSS-REFERENCE TO RELATED APPLICATIONS

This non-provisional patent application is a continuation application of prior U.S. utility application Ser. No. 11/260,991, filed on Oct. 28, 2005, which claims the benefit of U.S. provisional application No. 60/623,298, filed Oct. 28, 2004, the entire contents of both of which are incorporated herein by reference in their entirety.

TECHNICAL FIELD OF THE INVENTION

The present invention relates to systems and methods, including computer program products, for netting payments and other obligations (e.g., the obligation to post collateral or credit support) involving financial contracts. Generally, systems and methods of the present invention maximize market liquidity and minimize financial risk and collateral burdens of participants.

BACKGROUND OF THE INVENTION

A great deal of financial exposure exists for traders in financial markets. For example, in the energy markets, energy traders generally buy and sell several different energy commodities, such as electricity, oil, natural gas and coal. However, these energy traders trade commodities both in a physical sense, where actual delivery of a product will eventually take place, and in a financial sense, where only money will change hands based on future market value. Energy traders often trade these commodities with each other—exchanging different quantities of the same commodity several times during a given month, week or day. As a result of this web of trading contracts, the financial exposure between companies might be billions of dollars on any given day. When one of these companies encounters financial difficulties, causing it to default under an agreement or file for bankruptcy, the stage is set for financial disaster.

The collapse of large energy trading companies such as Enron and Dynegy are real-life examples of this problem, which has resulted in changes to current energy trading. The extent of money lost reach into the billions of dollars due to these scandals and has resulted in lawsuits and criminal charges. Under traditional trading agreements, a defaulting company might be able to avoid payment of outstanding obligations, yet still collect payments that it is owed. Further exacerbating the problem, the company required to make payment without receiving what it is owed might then be forced to default on its obligations to other companies.

As such, energy traders have a heightened interest in dealing with companies with appropriate creditworthiness. However, obtaining the necessary credit is a time-consuming and expensive proposition for most participants. Furthermore, obtaining the appropriate credit is a slow and cumbersome process that can impede the efficiency and speed of trading in energy. Not to mention, obtaining credit is a drain on the balance sheets of many companies. Since energy trading companies do much of their trading with each other, there is a need to create efficient strategies for maximizing market liquidity and minimizing collateral burdens for these participants.

Accordingly, there is a need in the art for methods and systems for netting payments and/or collateral obligations that maximizes market liquidity and minimizes collateral burdens between participants. Particularly, there is a need of such methods and systems in the energy industry.

SUMMARY OF THE INVENTION

Netting arrangements between parties in volatile and irregular markets maximize market liquidity while reducing financial (or market) risk between the participants. Methods and systems of the present invention involve netting payments or collateral obligations between participants. Generally, the invention includes automated settling or reducing of an amount of a payment or a collateral obligation for a first participant owed to a second participant. In some embodiments of the invention, the settling or reducing step is performed by a clearing organization. However, in other embodiments, the payment or collateral obligation owed by one participant to a second participant is a result of a bilateral or multilateral agreement between the two or more participants. In some embodiments, methods and systems include a network for settling and/or reducing payment and/or collateral obligations between participants.

In some embodiments, the present invention also generally provides for the reduction of the amount of collateral or other credit support required to be provided by a participant in satisfaction of a collateral obligation. Also, in some embodiments, the present invention generally provides for the reduction of the amount of any cash payment required to be made by said first participant in satisfaction of a payment obligation. Reducing the amount of collateral and/or the amount of monetary payment required for a particular transaction (or series of transactions) provides market efficiencies, particularly in the energy market.

Methods and systems of the invention maximize market liquidity and minimize collateral burdens on a participant, such as an energy market participant. In addition, in some embodiments, methods and systems of the invention provides a solution that does not involve credit intermediation via a central counterparty, does not expose a participant to additional risk, and/or disrupt or negatively revise the original credit obligations/considerations.

Participants according to the present invention include individuals, traders, companies, and any other entities that deal with payments and collateral obligations. Participants can also include, without limitation, dealers/trading firms, brokers, banks, custodians, mutual funds, insurance companies, hedge funds, etc. For examples, participants include Forward Contract Merchants (FCM's).

In preferred embodiments, participants include individuals and entities that are involved in the energy markets. The problems associated with high risk and exposure can be especially oppressive in the energy markets. Netting arrangements can benefit participants in the energy markets to maximize market liquidity while reducing financial (or market) risk between the energy participants. Generally, participants in the energy market are associated with high risk due to high collateral requirements on trades, high counterparty failure risk and expensive credit intermediation. A great deal of collateral is required in energy to secure payments due on energy delivered, to secure for failure to perform/pay on other contracts, and to secure credit enhancement for the energy participants.

As such, netting systems and methods described herein lower barriers to entry for energy market participants. In addition, the methods and systems of the present invention do not change or disturb the existing credit relationships. In fact, systems and methods of the present invention reduce obligations between any two participants to make payments or post collateral, and never increases such obligations. Moreover, the present invention does not reverse obligor/oblige relations between two participants. Furthermore, the present invention does not create new obligations between two parties that did not exist prior to the netting methods described herein.

Generally, netting according to some embodiments of the present invention involves off-setting with at least one market participant of financial payments or obligations one is owed with those one is entitled to receive, thus reducing the costs arising out of settlements. Netting also is used as a risk management tool to help market participants reduce their exposure to market or credit risk. For example, netting generally reduces transfers of funds between market participants to a net amount by mutually offsetting claims and liabilities from transactions between participants.

As described herein, some embodiments of the present invention also optimizes or makes more-efficient intra-group capital/commodity transactions. In a basic example, netting involves the mutual offsetting of payments due between business entities. For example, if Company A owes Company B $100, and Company B owes Company A $60, a single payment of $40 from Company A to Company B would eliminate both debts. This is netting. Total transaction costs and capital required are mitigated by netting.

There are various multilateral netting schemes according to the embodiments of the present invention. Payment netting is a process that is applicable to payments on matured contracts or those that are terminated or perceived to be terminated under the applicable insolvency laws. Payment netting generally constitutes finding round trips that are deemed paid by a clearing organization or netted out and then left with bilateral payment obligations. Another type of multilateral netting involves netting of collateral obligations. Sources of collateral requirements includes, for example, security for payments due on energy delivered (complete principal risk), security for failure to perform/pay on other contracts (primarily market/cover risk); and, security for credit enhancement. Collateral requirements are particularly problematic for energy market participants because of a lack of ready collateral on balance sheets of energy trading firms due to the high use of letters of credit and cash in the industry. Generally, methods and systems according to this embodiment of the invention involve finding round trips of collateral. For those round trips that are identified, cash payments/credits are deemed to have moved on the "books" of the clearing organization, without the infusion of collateral or other assets on the part of the participants.

The present invention is intended to reduce risk by participants through payment and collateral obligation netting. As described herein, netting allows the participants to set-off any amounts they owe each other and only pay the "net" owed from one party to the other. The present invention manages various agreements under one system that manages the payment and collateral obligations between the participants.

One advantage of the methods and systems of the present invention is that a participant does not have to unwind the system if a participant were to fail in their obligations or payments. The invention provides for the reduction of the amount of payment or collateral needed between participants, through set-off reductions. Assets are deemed to have moved in respect of obligations netted out.

In one embodiment, the present invention includes netting methods and systems for use in post-trade processing for the commodity and capital markets, comprising all assets classes, over-the-counter (OTC) and listed derivatives markets relating to underlying commodities and securities (including financial instruments or contracts). The present invention also includes collateral and payment netting of bilateral contracts and contracts with and between Independent Service Organizations (ISO's.) Also included in some embodiments of the invention are physical and financial settled products.

In a preferred embodiment, methods and systems of the invention include financial or commodity markets, and more particularly, energy markets (e.g., U.S. energy market). In a more preferred embodiment, the invention involves power, natural gas and oil contracts. As such, contracts according to the invention include financially and physically settled spot and forward contracts for power, natural gas and oil, as well as related derivative contracts, including futures, swaps, options, contracts for difference and the like.

To the extent the contracts are OTC, they will be comprised either of bilateral contracts between two participants, for example, in the U.S. energy markets, contracts matched by a broker or a matching service, or contracts executed in markets operated by Independent Service Operators ("ISOs") or Regional Transmission Operators ("RTOs"). ISOs and RTOs operate under the jurisdiction of regulatory bodies at the Federal and State level.

To the extent the contracts are listed energy derivative contracts, they may be comprised of the standardized contracts executed on an energy exchange including, for example, NYMEX or the Intercontinental Exchange.

Contracts, according to the invention, give rise to the obligation to make cash payments, generally either as a result of receipt of power, gas or other commodity, or else pursuant to the terms of related derivative contracts calling for scheduled payments (which may be fixed or variable) or payments upon the occurrence of designated events. Contracts also may give rise to payment obligations upon early termination pursuant to their terms.

For purposes of the present invention, a payment obligation can arise when the payable accrues, regardless of the fact that billing cycles or normal payment terms and processes result in actual payment being made other than on date of accrual. Alternatively, in another embodiment, a payment obligation can arise when they are actually due and payable. In yet another embodiment, a payment obligation can include any forward obligation to pay that has not accrued or become due and payable. As such, systems and methods of the present invention can operate under either option or any combination thereof.

As described herein, the present invention can include a collateral obligation. For example, one or more of the participants to any contract may be obligated to post collateral with, or otherwise provide credit support to, one or more other participants pursuant either to the terms of the contract itself or pursuant to other binding arrangements. These binding arrangements (legal or otherwise may include bilateral master credit agreements between participants, master purchase and sale agreements, industry standard agreements and the rules and regulations of ISOs and RTOs executing the contract) obligating participants to the contracts to post collateral or provide credit support in connections with their obligations under such contracts. Methods and systems of the invention also support an independent pricing source for collateral determination. In some embodiments, the invention includes two participants that are participants to a contract. In other embodiments of the invention, more than two participants are participants to a contract.

At any given time, any participants to one or more contracts may have one or more payment obligations and/or collateral obligations owing another participants to the same contracts. It is not unusual for these obligations to be netted (legal or otherwise) on a bilateral basis between the two participants, but they need not be. Bilateral netting of payment and collateral obligations (as described herein) may be effected as an operation undertaken according to the invention, however such bilateral netting is not required or essential. In one embodiment, the result of any such bilateral netting would be to make it so that there is at most one payment obligation and one collateral obligation between any two participants to contracts subject to methods and systems according to the invention.

Exemplary netting procedures described herein that involve payment and collateral obligations may operate in one of two related, yet distinct, ways (as described herein). Two contemplated commercial services and/or products include "DTCC Paynet™" and "DTCC CollateralNet™", which respectively is directed to payment obligations and collateral obligations. The particular service or product that is utilized depends on the circumstances and needs of the participants to the contracts. In some embodiments, where the processes are identical, the payment and collateral obligation schemes (i.e., "DTCC Paynet™" and "DTCC CollateralNet™") may be combined as described herein.

Generally, a network according to the present invention can include at least one server in communication with the network for transmitting the data appropriate for netting payment and/or collateral obligations (e.g., amount and/or type of payment and/or collateral). In addition, a network can include at least one receiver for receiving this data. The receiver can provide access for a participant or a user to access the information and/or commence netting of payment and/or collateral obligations. A receiver can include an appropriate identifier that can provide an authorized participant or user access to this data. The receiver also can be in communication with the network and/or server(s). In addition, a receiver can have any appropriate audio and/or visual display for allowing a participant to obtain the data that is transmitted. In some embodiments, a server according to the present invention is a database server.

A server according to the invention retrievably stores the data appropriate for netting payment and/or collateral obligations. In other embodiments, a provider in communication with the network can broadcast or transmit the information to a receiver so that a participant can have access to the information. A network can include at least one web server. The web server can be in communication with the network. The web server allows for accessing and/or transmitting data via the Internet. Networks can include wireline or wireless networks, such as the WAN, Internet, cellular, Bluetooth, satellite, company intranets, and the like. Any appropriate network for transmitting data between participants is contemplated according to the present invention. In some embodiments, the data transmitted in the network can be encrypted using any appropriate encryption algorithm (e.g., using 128-bit cipher strength encryption).

Description of Netting Processes—General
Clearing Organization Operation

In some embodiments, the invention includes bilateral or multilateral agreements between participants that do not include a clearing organization. For example, methods and systems of the invention involve a contract or process that is agreed among parties to Contracts (i.e., without a clearing organization.) However, in some embodiments of the invention, methods and systems include a clearing organization. In related embodiments, the payment and collateral netting schemes are operations undertaken by a "clearing organization" as defined in the Federal Deposit Insurance Corporation Improvement Act of 1991 ("FDICIA"), particularly 12 U.S.C. section 4401 et. seq. Also, in some embodiments, a clearing organization includes any organization that purports to effect or settle payment obligations or other obligations to transfer or pledge assets or that purports to net such payment obligations or obligations to transfer or pledge assets.

A participant according to the invention can establish accounts with a clearing organization for purpose of effecting payments and transferring, pledging or providing collateral. Generally, a participant should execute an agreement to be bound by the rules governing the netting systems and methods described herein. Also, participants should report payment and collateral obligations and/or agree on third party reporting. In some embodiments, a clearing organization can operate a payment/deal reconciliation service in a derivatives market, for example. Participants should also pay netting fees sufficient to cover operating costs of providing the netting systems and methods.

The PayNet™ and CollateralNet™ operations will be binding on participants to contracts that participate in the PayNet™ or CollateralNet™ processes as a result of contracts executed between participants and the clearing organization. Each participant must open one or more accounts at the clearing organization for the purpose of effecting payments and transferring, pledging or providing collateral.

General Aims of Netting Methods

In some embodiments of the invention, as further described below, the payment and collateral netting schemes (e.g., PayNet™ or CollateralNet™ services and products) can operate in either of two ways.

"Method 1 Netting":

First, in some embodiments, methods and systems of the invention will reduce the amount of the payment obligation or collateral obligation that may exist at a given time between two parties to contracts. In other embodiments, the amount of the payment obligation or collateral obligation may be reduced to zero. In these embodiments, the netting processes will never increase the amount of any payment or collateral obligation between two parties or to cause an payer/obligor under a payment or collateral obligation to become a payee/obligee (and vice versa). Nor will the processes operate to create a payment or collateral obligation between parties to contracts that did not have one or create any payment or collateral obligations to or from parties to contracts and some third party or participants (such as a central counterparty clearing organization).

"Method 2 Netting":

Second, in some embodiments, methods and systems of the invention will reduce the amount of collateral or other credit support required to be provided by a party in satisfaction of its collateral obligation; or, to reduce the amount of any cash payment required to be made by a party in satisfaction of its payment obligation. As such, in either case, the amount of the collateral obligation or payment obligation will not be reduced. Rather, the portion of a participant's collateral obligation or payment obligation not satisfied by the participant individually through the provision of collateral or the making of a cash payment will be satisfied through the operation of the methods and systems of the invention, as described herein.

Reporting of Payment and Collateral Obligations to the Clearing Organization

According to embodiments of the invention that include a clearing organization, PayNet™ or CollateralNet™ processes, for example, will be applied to payment obligations and collateral obligations reported to the clearing organization by participants or by third parties designated under the rules of the clearing organization applicable to the processes. In some embodiments, the clearing organization will verify or take responsibility for the accuracy of the reported obligations. Where the clearing organization does not verify or take responsibility for the accuracy of the reported obligations, in some embodiments, it will be the responsibility of the participants to assure that the reported obligations are binding and enforceable as reported and participants will so represent to the clearing organization.

Bilateral Netting

In general, participants to contracts may have arrangements in place under which payment obligations and/or obligations to provide collateral under multiple contracts are netted bilaterally to one net amount (either payment or collateral) owed by one participant to the other. Where this is the case, payment obligations or collateral obligations could be reported already netted. Where this is not the case or where the payment or collateral obligations are not reported on a bilaterally netted basis, the clearing organization will effect bilateral netting of all payment and collateral obligations in the same currency by arithmetically adding the payment or collateral obligations between any two participants (pay/deliver obligations being negative numbers and receive obligations being positive numbers).

Under the "Method 1 Netting" embodiment, the reported multiple payment or collateral obligations between two participants will be replaced with a single obligation equal to the foregoing arithmetic sum. Under the "Method 2 Netting" embodiment, the reported multiple payment or collateral obligations will be marked on the books of the clearing organization as satisfied to the extent they can be through the transfer of equal and offsetting cash amounts. Again, an obligation in the amount of the foregoing arithmetic sum will remain unsatisfied and will be treated as a reported obligation for the purposes of methods and systems of the invention as described herein.

A detailed description of certain embodiments of the invention is provided below. Other embodiments, features, aspects and advantages of the invention are apparent upon review of the detailed description and accompanying drawings that follow.

DETAILED DESCRIPTION OF THE INVENTION

According to the present invention, in general, netting is the offsetting with a counterparty of financial obligations or payments one is owed with those one is entitled to receive, thus reducing the costs arising out of payment settlements. Netting also is used as a risk management tool to help participants reduce their exposure to credit risk. Netting generally reduces transfers of funds between market participants (e.g., separate companies) to a net amount. Netting mutually offsets claims and liabilities from identical types of transaction between parties, and is important in connection with the capital adequacy requirements applicable to energy traders, for example.

PayNet™ or CollateralNet™ Services and Products
Identification of "Round Robin" Obligations At the times and in intervals designated in the rules of the clearing organization (or pursuant to contract with participants), in some embodiments, the clearing organization will identify "round robin" payment and collateral obligations from those reported to it (and after any necessary bilateral netting as described above). Round robin payment or collateral obligations are those that could be satisfied through the movement of cash from one participant to another where cash initially moved from one participant would ultimately end up being transferred back to that participant.

In its simplest form, a round robin obligation would pass through three participants and would constitute the smallest payment or collateral obligation between any two of those three participants.

Figure 1A:
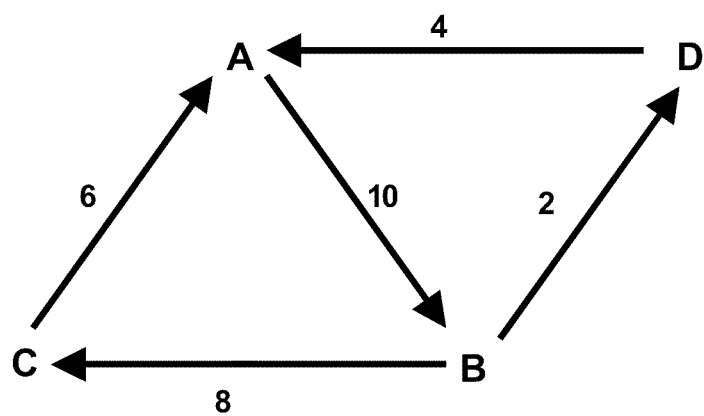
FIG. 1A is an exemplary illustration of a round robin obligation.

FIG. 1A is an exemplary illustration of a round robin obligation. Participants A, B, C and D along with their respective payment obligations are provided in FIG. 1A. As shown in FIG. 1A, two separate round robins can be identified from these relationships: First, there is an obligation of 6 from A to B to C back to A. Note that it does not matter which participant is chosen as the starting point. Second, there is an obligation of 2 from A to B to D back to A.

Application of "Method 1 Netting" to the Round Robins

Once round robins have been identified, the clearing organization would eliminate all round robin obligations, thus reducing the bilateral obligations each applicable participant had with each other. In the case of the above example, as shown in FIG. 1B, elimination of both round robins would result in the following post-netting obligations to be settled individually amongst participants:

D owes 2 to A
A owes 2 to B
B owes 2 to C

Figure 1B:
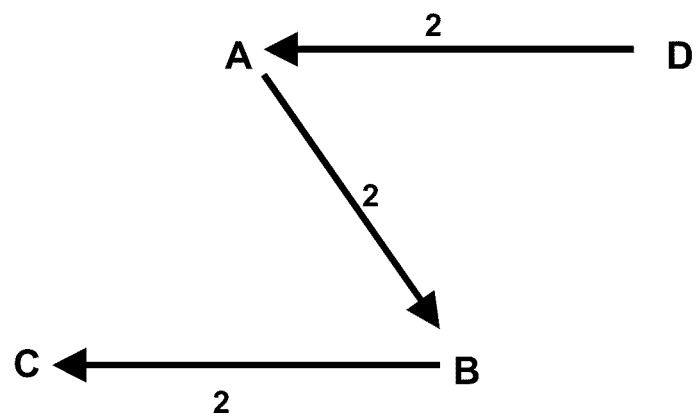
FIG. 1B is an illustration of the post-netting obligations to be settled individually amongst participants of the round robin illustration of FIG. 1A.

As shown in FIG. 1B, the obligation of 2 may either be collateral or a payment obligation, but it is likely that "Method 1 Netting" will be used primarily or exclusively for DTCC PayNet™, for example.

According to the present invention, no further netting is carried out under Method 1 for the example above. While it may be intuitive to attempt, in the above example, to remove A and B as unnecessary links in a payment chain beginning with D and ending with C, to do so would create obligations where none existed before, violating the netting constraints described at the outset.

Application of "Method 2 Netting" to the Round Robins

In some embodiments, once round robins have been identified, the clearing organization of the present invention would actually effect cash payments in accordance with the identified round robin obligations by marking its books to reflect the appropriate cash movements, regardless of whether the obligations were payment obligations or collateral obligations. In the case of the above example, as shown in FIGS. 1A and 1B, the books of the clearing organization would reflect the following cash movements:

6 from A to B to C to A (note that it does not matter which participant is taken as the starting point, it is equivalent to have the books reflect 6 from B to C to A to B or from C to A to B to C)

2 from A to B to D to A

In some embodiments, the rules of the clearing organization (binding on the participant) will provide that collateral obligations may be satisfied through actual transfers of cash. As such, the clearing organization will obtain comfort that "Method 2 Netting" will have the same effect as physical transfers of cash in accordance with the identified round robins.

After the application of "Method 2 Netting", as shown in FIG. 1B, participants would be left with the same obligations to fulfill amongst themselves as they have under "Method 1 Netting", regardless of whether they are payment obligations or collateral obligations.

In embodiments where A is an independent service organization ("ISO"), the payments required under the round robin payment or collateral obligations are eliminated from the ISO's books. As such, the obligations payable are no longer due and owning under the payment netting methods according to the invention.

Application of Netting Across Payment and Collateral Obligations

According to the present invention, to the extent that the above netting methods are used for payment obligations and collateral obligations, the following additional netting processes may be offered by the clearing organization. All obligations, whether payment or collateral, between to participants will be bilaterally netted as described above (in accordance with either Method 1 Netting or Method 2 Netting). Method 1 Netting or Method 2 Netting would then be applied to remaining net obligations between parties. When Method 1 Netting is used, payment obligations of any participant will be eliminated first, then collateral obligations. When Method 2 Netting is used payment obligations of any participant will be satisfied through netting operations first, then collateral obligations.

EXAMPLES

Example 1

Validation of Round Robins and Examples of Complex Round Robins

Validation of Round Robins

Valid round robins can be detected by selecting the possible permutations of payment or collateral obligations, and checking whether all obligations are in the same direction—if so, the round robin amount is the smallest absolute value of these obligations as described below.

Select mutual obligations for participants A, B, and C:

| | |
|---|---|
| A owes B: | 50 |
| B owes C: | 100 |
| C owes A: | 150 |

A valid round robin with a value of 50 can be extracted from this relationship.

By contrast, select mutual obligations for participants D, E, F:

| | |
|---|---|
| D owes E: | 50 |
| E owes F: | 100 |
| F owes D: | 150 |

Under the rules of the clearing organization, these obligations, whether payment or collateral could be satisfied through cash transfers, but no cash transfers beginning with any one participant would be transferred back to that participant under these obligations.

Example 2

Figure 2:
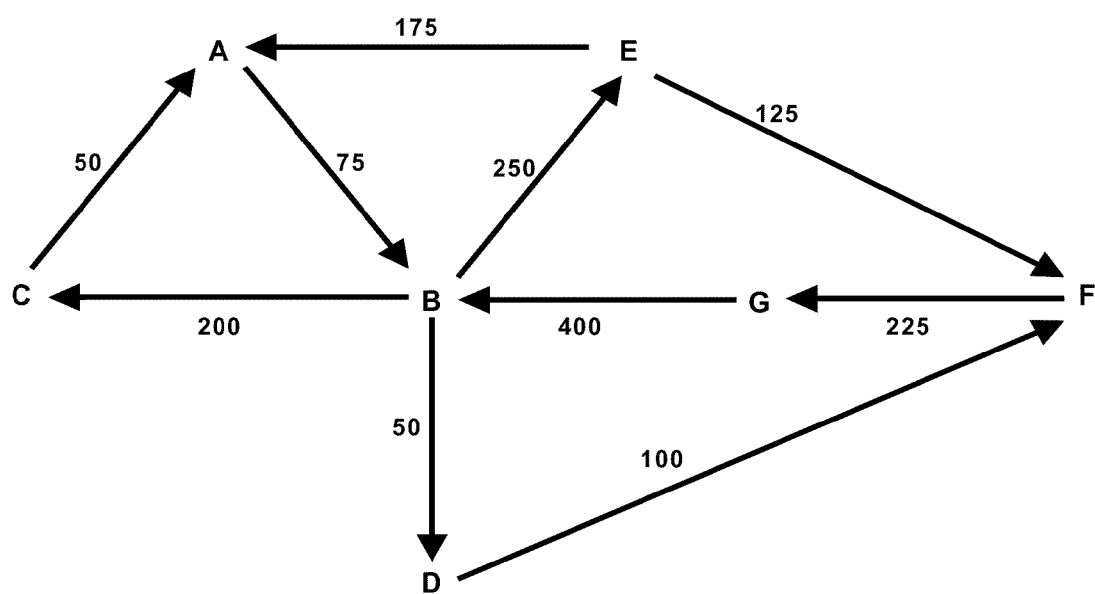
FIG. 2 is an exemplary illustration of a complex round robin involving an initial, bilaterally netted obligations (either payment or collateral).

An example of a complex round robin is illustrated in FIG. 2, which provides an example of an initial, bilaterally netted obligations (either payment or collateral).

Validation of Round Robins and Examples of Complex Round Robins

As detailed in FIG. 2, there are two three-way round robins (ABC, ABE) and two, four-way round robins trade (BEFG, BDFG).

Determining the Size of Round Robins

Figure 3:
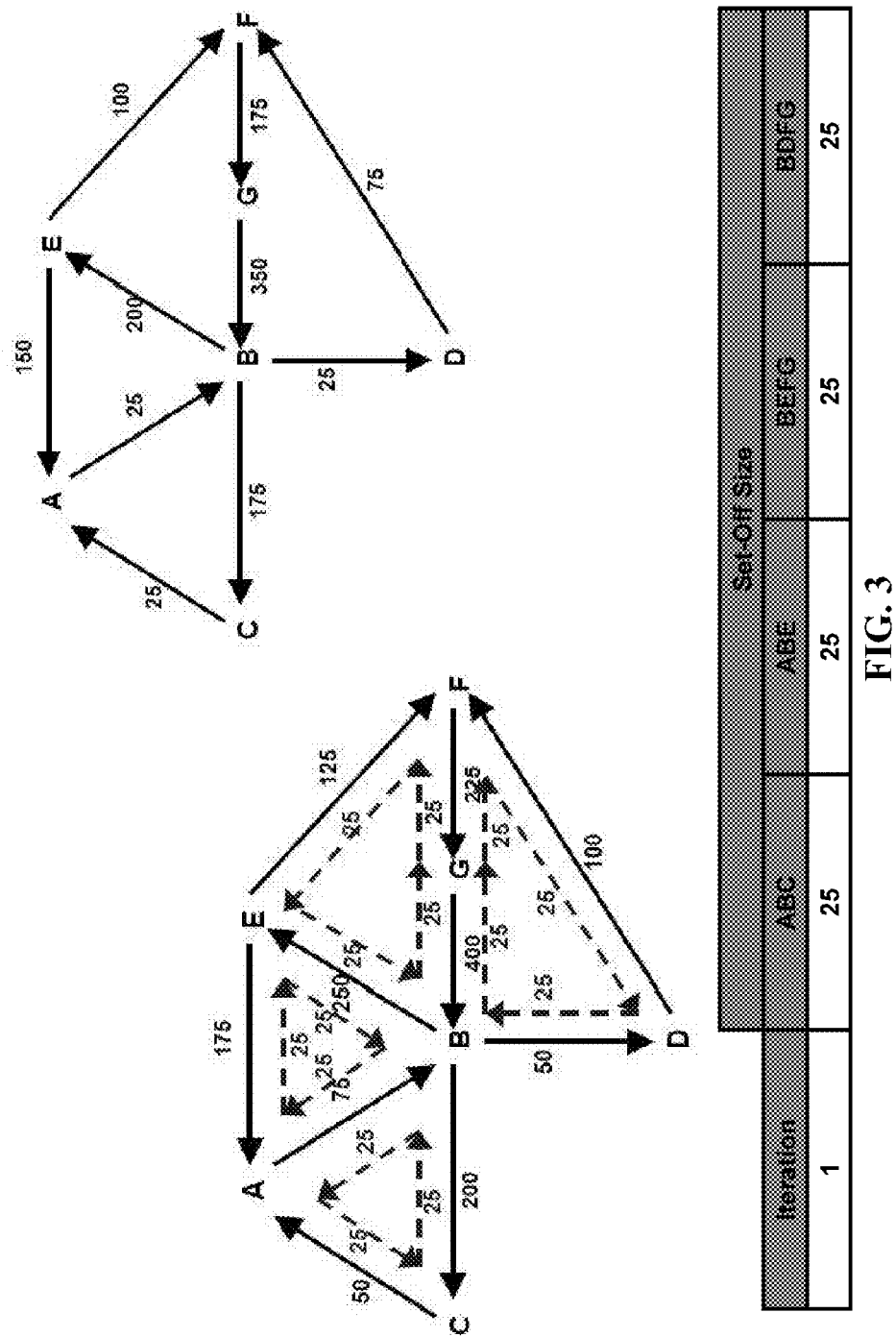
FIG. 3 illustrates the first iteration of the round robin process of FIG. 2.

Once the entire bilaterally netted obligation structure has been constructed the netting process can operate to maximize the size of the netted amount (round robin obligations) within each three- and four-way round robin. One method of doing this is illustrated in FIGS. 3-7 and described herein. FIG. 3 illustrates the first iteration of the process: an initial amount of 25 is possible for all four round robins in the obligation structure. This reduces each obligation in the structure by 25 and the two obligations that are part of two round robins (A to B and B to E) by 50 each. This outcome of the first iteration is described in the table at the bottom of FIG. 3.

Breaking Ties

Figure 4:
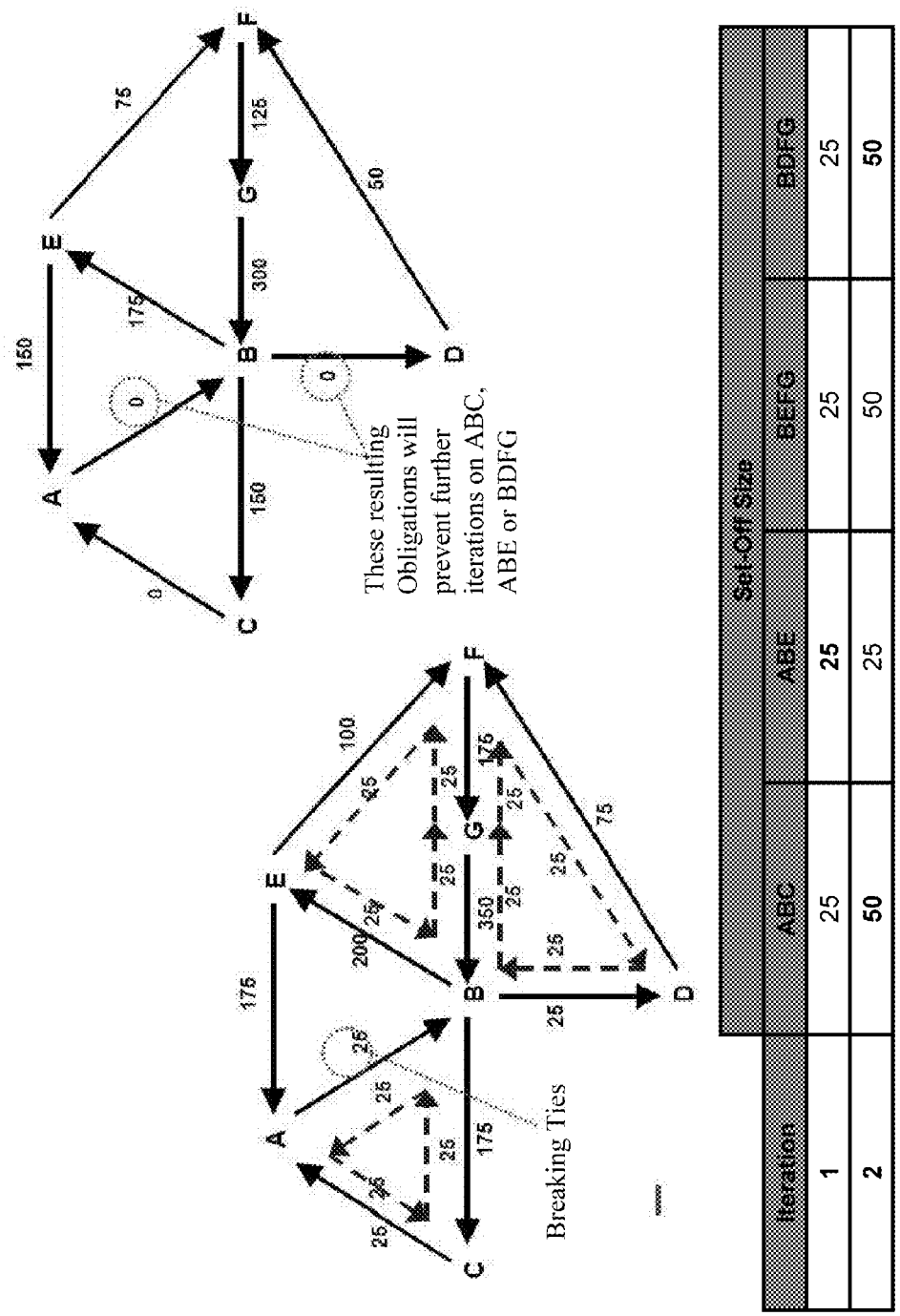
FIG. 4 illustrates the second iteration of the round robin process of FIG. 2.

FIGS. 3-7 illustrate that the process will always seek round robins that reduce original obligations to zero, if possible, even if it means breaking a tie. This is illustrated in FIG. 4 ("Iteration 2"). After the first iteration, it is possible to reduce positions in round robin ABC and ABE further only if the remaining 25 obligation of A to B is allocated to round robin ABC or ABE. In each situation like this, the process will allocate an obligation to a round robin at random. This situation could arise whenever an obligation is potentially part of two different round robins.

Achieving Maximum Set-Off

Figure 5:
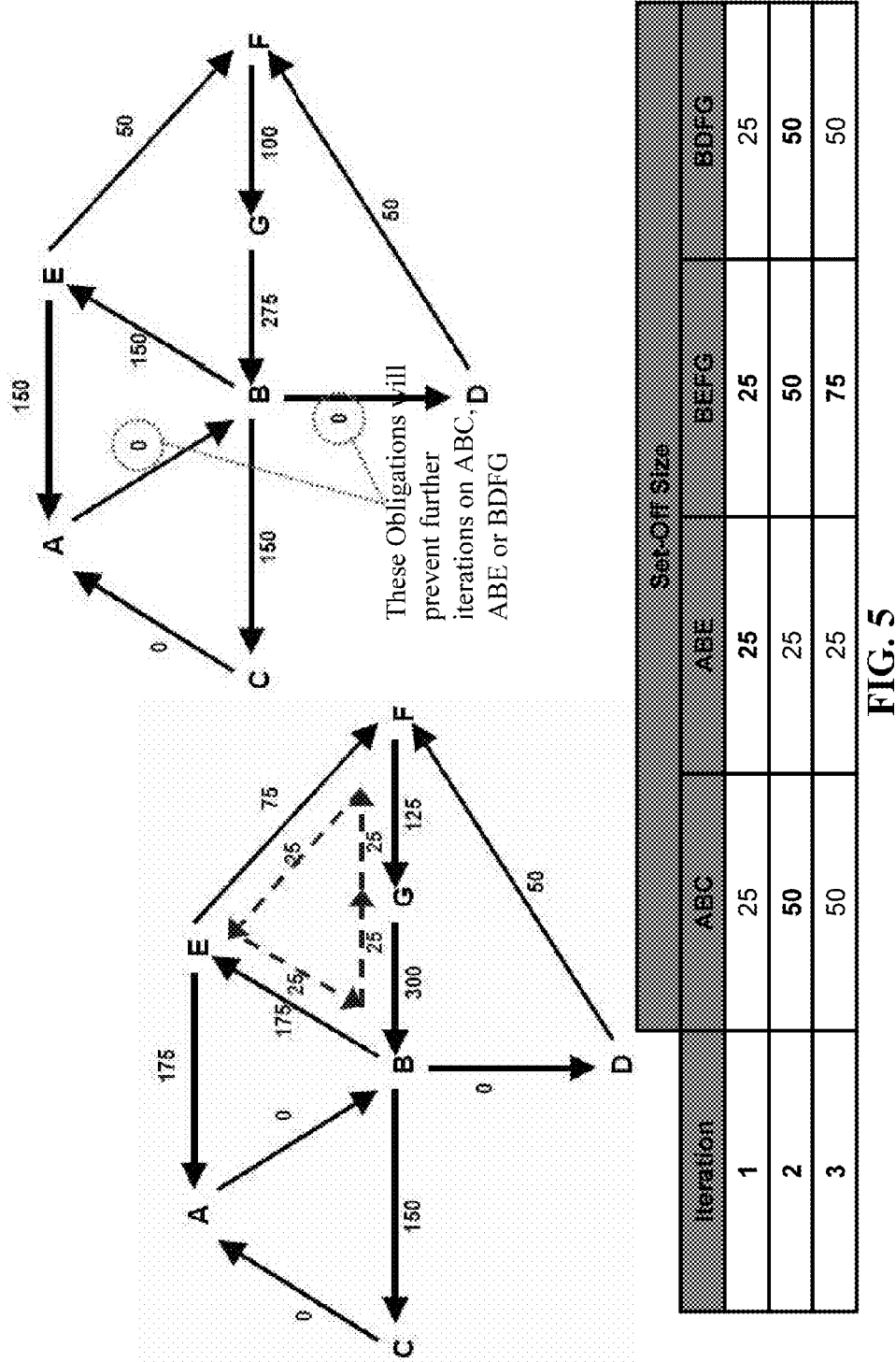
FIG. 5 illustrates the third iteration of the round robin process of FIG. 2.
Figure 6:
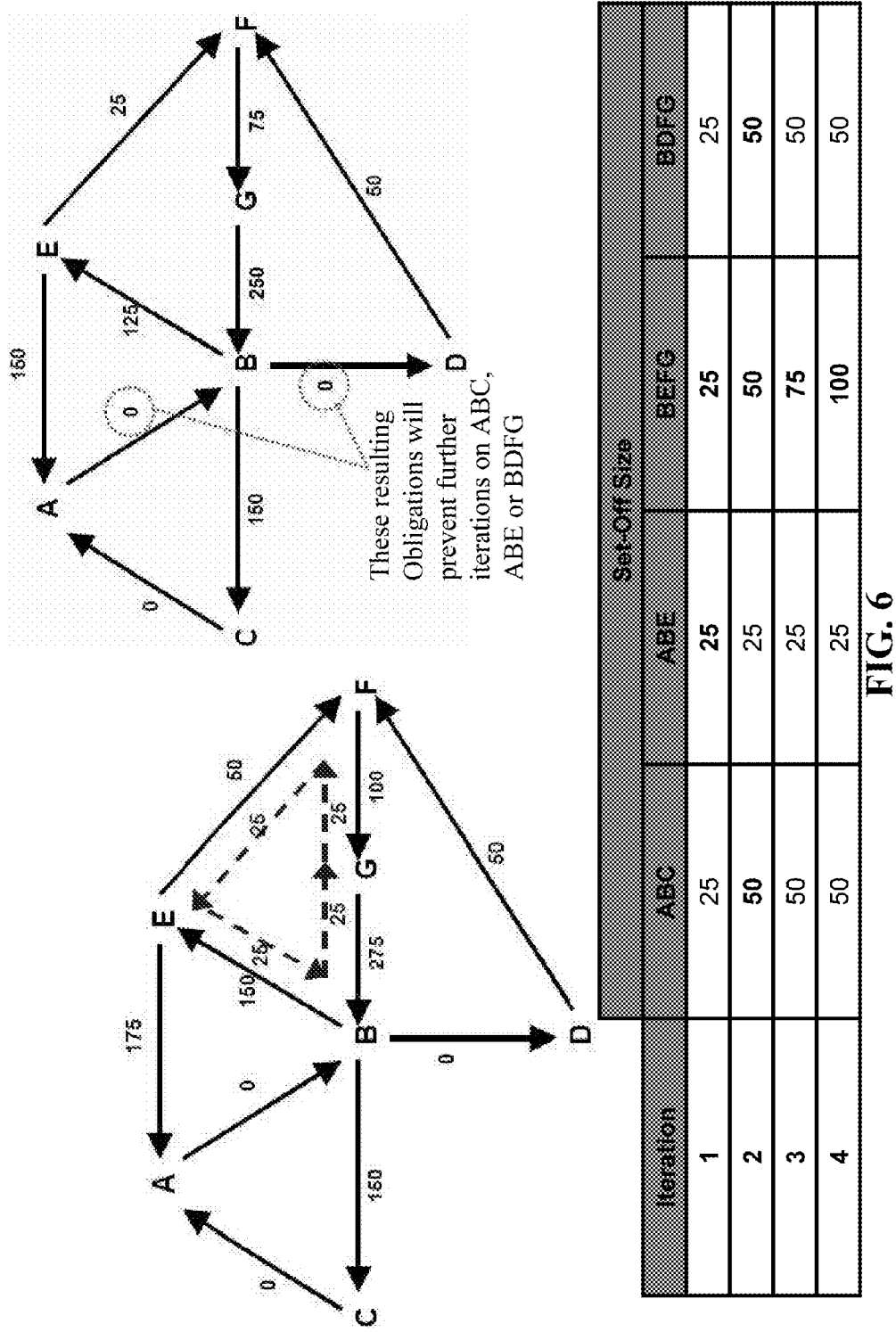
FIG. 6 illustrates the fourth iteration of the round robin process of FIG. 2.
Figure 7:
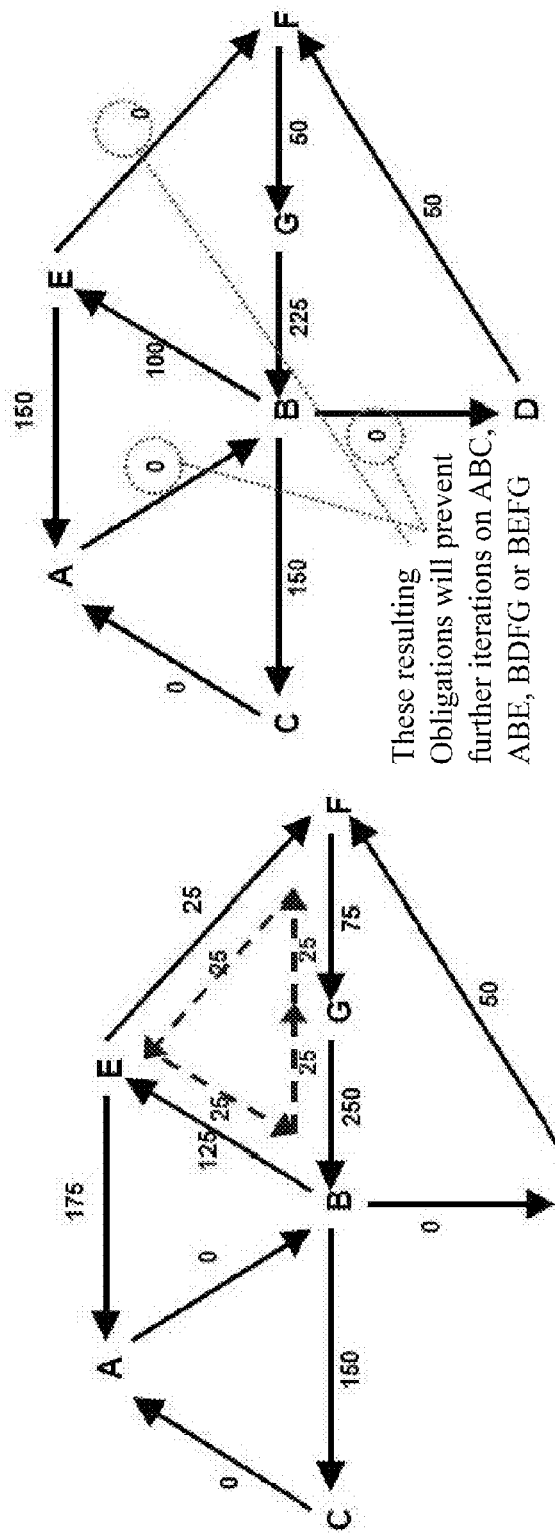
FIG. 7 illustrates the fifth iteration of the round robin process of FIG. 2.

Further reduction of positions is possible only through the round robin BEFG. This process is illustrated in FIGS. 5-7 ("Iterations 3-5). In the third, fourth and fifth iterations, the round robin amount for BEFG is increased by a total of 75. At the end of each iteration, the process checks for ties (there aren't any in this case, as there is only one round robin that can be subject to additional netting) and these are resolved. When obligation E-F is fully reduced, the round robin BEFG cannot be further reduced. The determination of the maximum amounts for the round robins in this obligation structure is now complete.

The above-described methods and systems can be implemented, in whole or in part, in digital electronic circuitry, or in computer hardware, firmware, software, or in combinations thereof. The implementation can be, for example, a computer system or network for managing the netting or setting-off of payments and collateral. A computer program or product is also contemplated for providing a market participant or clearing organization with the tools for implementing the processes provided herein. For example, the implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

In some embodiments, the invention features a system and method for netting or setting-off of payments and collateral for participants and clearing organizations in the energy industry. In one embodiment, multimedia information related to the payment obligations or collateral obligations, for example, may be displayed to at least one of the parties to monitor the status of a netting process. A communication channel can be opened over a network between the parties. The network can be a LAN, WAN, Intranet, the Internet, or the World Wide Web. In some embodiments, the communication channel can convey voice and/or text communications.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

In some embodiments, content related to the implementation of the strategy provided herein can be displayed to each party. Messages are exchanged in real-time between the parties over the communication channel to allow the parties (including the clearing organization) to review the status of the round robin or determine the netting effect, for example. Messages exchanged over the communication channel can guide the parties to take actions that lead toward implementing the invention provided herein.

In one aspect, the invention features a system for netting or setting-off of payments and/or collateral. The system comprises a plurality of client systems in communication with each other client system over the network using a communication channel. A server system, in communication with the plurality of client systems, presents the users of the client systems with a status of the netting process. The client systems exchange messages in real-time over the communication channel. The server system dynamically updates the content displayed to the client system users based on an action taken by one of the client system users or data provided to the system.

In another aspect, the invention features an article of manufacture having computer-readable program means embodied thereon for implementing the processes provided herein (e.g., netting or setting-off of payments and/or collateral.) The network over which the client systems and the server system communicate can be a local area network (LAN), a wide area network (WAN), or a global network of networks such as the Internet and the World Wide Web. The client systems and the server system can connect to the network through a variety of connections including standard telephone lines, LAN or WAN links (e.g., T1, T3, 56 kb, X.25), broadband connections (e.g., ISDN, Frame Relay, ATM), and wireless connections (e.g., 802.11 standards). Systems 4, 6 can establish connections using a variety of communication protocols (e.g., HTTP, TCP/IP, IPX, SPX, NetBIOS, Ethernet, RS232, and direct asynchronous connections).

Each client system can be any processor-based device (e.g., a personal computer) capable of displaying Web documents (e.g., HTML, XML Web pages) and communicating with the server system according to a protocol that transmits such Web documents. Each client system includes a display screen, a keyboard, a pointing device (e.g., a mouse, trackball, touchpad, touch-screen, etc), a microphone, one or more speakers, a processor, and persistent storage (not shown). The operating system of each client system can be one of a variety of windows-based platforms including but not limited to WINDOWS® 3.x, WINDOWS® 95, WINDOWS® 98, WINDOWS® NT 3.51, WINDOWS® NT 4.0, WINDOWS® XP, Macintosh® and Unix, DOS, Linux®, PALM® and WINDOWS® CE for windows-based terminals. The operating system produces a graphical user interface through which the user of the client system can interact with the display (e.g., by inputting information, clicking on objects, icons or menu items, opening and closing windows, and scrolling a displayed windows) using the keyboard or the pointing device.

The client systems can include browser software and a JVM (Java Virtual Machine). An exemplary embodiment of the browser is MICROSOFT INTERNET EXPLORER® manufactured by Microsoft Corporation of Redmond, Wash. The browser sends requests over the network to retrieve a Web document or Web page from a Web server (e.g., Web server described further below). The browser then processes the downloaded Web page with any accompanying graphics files and applets, and displays the results on the display screen of the client system. The JVM operates as an interpreter between Java bytecode and the operating system of the client system.

Voice capability can also be achieved through one of a variety of commercially available products, such as HearMe SDK (software development kit) or Roger Wilco, both manufactured by HearMe, or Java Media Framework, manufactured by Sun Microsystems of Palo Alto, Calif. and IBM of Armonk, N.Y. These products provide voice chat capabilities in the form of reusable software components such as ActiveX controls, browser plug-ins, APIs (application program interface), SDKs, and DLLs (dynamic link libraries).

To provide for interaction with a user, the above described techniques can be implemented on a receiver having a display device, e.g., a CRT (cathode ray tube) or LCD (liquid crystal display), for displaying information to the user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The server system can be in communication with a database and a Web server. The database stores data such as company information, commodity information, asset price, commodity price, asset valuation, commodity valuation, share price, share valuation, collateral price, collateral valuation, tracking stock price, tracking stock valuation, and other related information.

The invention also contemplates a Web server that supports a Web site (accessible worldwide) through which users of the client systems can launch a program provided herein. The Web site includes a plurality of Web pages that receive the users of the client systems (a reception page).

The present invention may be implemented as one or more computer-readable software programs embodied on or in one or more information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry. In general, any standard or proprietary, programming or interpretive language can be used to produce the computer-readable software programs. Examples of such languages include C, C++, Pascal, JAVA, BASIC, Visual Basic®, and Visual C++®. The software programs may be stored on or in one or more articles of manufacture as source code, object code, interpretive code, or executable code.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of networks include a local area network ("LAN") and a wide area network ("WAN"), e.g., the Internet, and include both wired and wireless networks.

The computing system can include clients and servers. A client and server are generally remote from each other and typically interact through a network. The relationship of client and server arises by virtue of computer programs running on the respective computers and having a client-server relationship to each other.

The invention may be embodied in other specific forms without departing from the spirit or essential characteristics thereof. The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A computerized method comprising the steps of:
providing, by a computer system, a subscription requiring two or more subscribing participants to abide by settlements of payment or collateral obligations, the subscription including an automatic trigger to settle a collateral obligation being netted without requiring approval from the participants;
receiving, at the computer system, data reported regarding two or more obligations between participants;
creating, by the computer system, a round-robin payment or collateral obligation structure based on data associated with the two or more reported obligations;
reducing, by the computer system, an amount of the two or more obligations between the participants based on an amount of each of the obligations;
maintaining, by the clearing organization, an account associated with each of the participants; and
updating, by the computer system, the accounts of each of the participants in the round-robin payment or collateral obligation structure to reflect the reduced amount.

2. The method of claim 1 wherein updating comprises eliminating the amount from the accounts of the participants in the round-robin payment or collateral obligation structure such that the amount is no longer due.

3. The method of claim 1 wherein:
reducing comprises satisfying the amount; and
updating comprises updating the accounts of the participants in the round-robin payment or collateral obligation structure such that the accounts indicate payment of the reduced amount without transmitting a payment between the participants.

4. The method of claim 1 further comprising verifying, by the clearing organization, an accuracy of each of the two or more obligations.

5. The method of claim 1 wherein the two or more obligations are between a first and second participant, and reducing comprises bilaterally netting the two or more obligations to one net amount owed by one of the first and second participant to the other.

6. The method of claim 5 wherein updating comprises replacing the two or more obligations in the accounts of the first and second participants with one obligation equal to the netted amount.

7. The method of claim 5 wherein updating comprises marking the two or more obligations in the accounts as satisfied without transmitting a payment from the first participant to the second participant, such that an amount equal to the one net amount remains unsatisfied in the first or second account.

8. A computerized method comprising the steps of:
receiving, by a computer system, data associated with a first obligation and a second obligation, the first obligation being a payment or collateral obligation owed from a first participant to a second participant, the second obligation being a payment or collateral obligation from the second participant to the first participant;
creating, by the computer system, a round-robin payment or collateral obligation structure between the first participant and the second participant based on the first and second obligations;
reducing, by the computer system, an amount of the first obligation based on the second obligation; and
updating, by the computer system, an account of each of the first participant and the second participant to reflect the reduced amount, wherein the amount is eliminated from the accounts such that the reduced amount is no longer due.

9. The method of claim 8 further comprising:
determining whether one or more participants failed to satisfy a payment or collateral obligation; and
maintaining the round-robin payment or collateral obligation structure in response to determining one or more parties failed.

10. The method of claim 8 wherein the round-robin payment or collateral obligation structure does not disrupt an original credit obligation between the first and second participants.

11. The method of claim 8 wherein the round-robin payment or collateral obligation structure does not reverse an original credit obligation between the first and second participants if the second obligation is an amount greater than the first obligation.

12. A computerized method comprising the steps of:
receiving, by a computer system, data associated with a first obligation and a second obligation, the first obligation being a payment or collateral obligation owed from a first participant to a second participant, the second obligation being a payment or collateral obligation from the second participant to the first participant;
creating, by the computer system, a round-robin payment or collateral obligation structure between the first participant and the second participant based on the first and second obligations;

reducing, by the computer system, an amount of the first obligation based on a second obligation; and updating, by the computer system, an account of each of the first participant and the second participant to reflect the reduced amount, wherein the account indicates a payment of the reduced amount without transmitting a payment from the first participant to the second participant.

13. The method of claim 12 further comprising:

determining whether one or more participants failed to satisfy a payment or collateral obligation; and maintaining the round-robin payment or collateral obligation structure in response to determining one or more participants failed.

14. The method of claim 12 wherein the round-robin payment or collateral obligation structure does not disrupt an original credit obligation between the first and second participants.

15. The method of claim 12 wherein the round-robin payment or collateral obligation structure does not reverse an original credit obligation between the first and second participants if the second obligation is an amount greater than the first obligation.

16. An apparatus comprising a computer system with a processor and memory configured to:

receive data associated with a first obligation and a second obligation, the first obligation being a payment or collateral obligation owed from a first participant to a second participant, the second obligation being a payment or collateral obligation from the second participant to the first participant;

create a round-robin payment or collateral obligation structure between the first participant and the second participant based on the first and second obligations;

reduce an amount of the first obligation based on the second obligation; and update an account of each of the first participant and the second participant to reflect the reduced amount, wherein the amount is eliminated from the accounts such that the reduced amount is no longer due.

* * * * *